(12) United States Patent
Watkins, Sr. et al.

(10) Patent No.: US 8,135,658 B1
(45) Date of Patent: Mar. 13, 2012

(54) SYSTEMS AND METHODS FOR PROVIDING REAL-TIME OVER-RIDE CAPABILITY

(75) Inventors: Christopher J. Watkins, Sr., San Antonio, TX (US); Vance E. Rankin, San Antonio, TX (US); James Elden Nicholson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 805 days.

(21) Appl. No.: 12/107,311

(22) Filed: Apr. 22, 2008

(51) Int. Cl.
*G06F 17/00* (2006.01)
*G06N 5/02* (2006.01)
*G06Q 40/00* (2006.01)

(52) U.S. Cl. ............................................. 706/47; 705/4
(58) Field of Classification Search ................. 706/47; 705/4
See application file for complete search history.

(56) References Cited

U.S. PATENT DOCUMENTS

| | | | |
|---|---|---|---|
| 4,831,526 | A | 5/1989 | Luchs et al. |
| 4,975,840 | A | 12/1990 | DeTore et al. |
| 6,536,037 | B1 | 3/2003 | Guheen et al. |
| 2003/0149656 | A1 | 8/2003 | Magruder et al. |
| 2004/0215552 | A1 | 10/2004 | Horn |
| 2005/0144047 | A1 | 6/2005 | Tran et al. |
| 2009/0119133 | A1* | 5/2009 | Yeransian et al. ............... 705/4 |
| 2009/0177501 | A1 | 7/2009 | Grover et al. |

OTHER PUBLICATIONS

K. Aggour, P, Bonissone, W. Cheetham, and R. Messmer, "Automated Underwriting of Insurance Applications", AI Magazine, vol. 27, No. 3, 2006, pp. 36-50.*

Bonissone, et al, "Evolutionary Optimization of Fuzzy Decision Systems for Automated Insurance Underwriting". In Proceedings of the 2002 IEEE International Conference on Fuzzy Systems. vol. 2, p. 1003-1008. Meeting date—May 12-17, 2002, Honolulu, HI, USA. Retrieved from the Internet: <URL: http://www.crd.ge.com/cooltechnologies/pdf/2002grc170.pdf>.

* cited by examiner

*Primary Examiner* — Jeffrey A Gaffin
*Assistant Examiner* — Vincent Gonzales
(74) *Attorney, Agent, or Firm* — Brooks, Cameron & Huebsch

(57) ABSTRACT

Decision software implements a decision process that handles and decides a request from a requestor in a generally automated manner. The decision software denies the request according to a predefined standard. Information relating to the request and the denial decision is stored as a quote, and it is determined that further consideration of the denial decision by a human reviewer of the organization is desired. The human reviewer is contacted and retrieves the stored quote by way of an actuated interface that presents the quote as a focused screen including information from the quote and a determination entry device. The human interviewer determines based at least in part on the focused screen whether to over-ride the denial decision and enters such determination into the determination entry device. The entered determination is stored with the stored quote and the request proceeds in accordance with the stored determination.

21 Claims, 4 Drawing Sheets

SYSTEMS AND METHODS FOR PROVIDING REAL-TIME OVER-RIDE CAPABILITY

CROSS-REFERENCE TO RELATED APPLICATION(S)

The present application is filed concurrently with and shares a common title and disclosure with the following applications, each of which is hereby incorporated herein by reference in its entirety:

U.S. patent application Ser. No. 12/107,317; and
U.S. patent application Ser. No. 12/107,339.

FIELD

The present disclosure is directed to systems and methods that allow an automated decision to be changed by a manual over-ride in a real-time or near-real-time manner. More particularly, the present disclosure is directed to such systems and methods that are employed in an organization such as an insurance organization, where the decision is to deny underwriting a particular insurance policy, and the over-ride is performed by an underwriter or the like based on particular circumstances.

BACKGROUND

In a highly automated operation such as may be employed by a large organization, a requestor may request a particular action and a decision on whether to take the particular action may be performed in an automated manner. Specifically, the organization may employ software or the like that guides the process of making the decision. For example, in an insurance organization, the decision on whether to issue or update an insurance policy may be made with the aid of such decision software, either as employed directly by the requestor or by an agent or representative or the like (hereinafter, 'representative') of the insurance organization acting at the behest of the requestor.

Notably, the decision software may be provided with information as supplied by the requestor, and also with information obtained from other sources. For example, the decision software that determines whether an automobile policy can be issued for a particular individual as a driver may require the name of the individual and a driver's license or the like of the individual as supplied by the requestor, and may in turn employ such information to obtain a driving record for the individual from a driving record database as maintained by a governmental entity that issued the driver's license or the like.

As should be understood, based on all of the provided information the decision software determines whether the automobile policy can be issued or updated according to predefined underwriting standards provided to the decision software in a form recognizable by the decision software. Such predefined standards can be relatively simple or complex depending on circumstances. For example, a relatively simple standard may state that a policy cannot be issued for a driver below the age of 14. In contrast, a relatively complex standard may state that:

An operator [driver] may qualify for a Bodily Injury limit greater than their current limits or greater than $250,000 per person and $750,000 per occurrence, whichever is higher, on a policy only if any of the following are true:
1) The driving history for:
  i) Each Active operator in the household has less than three At-Fault Accidents whose accident date is within the last three years of transaction effective date.
  ii) Each Active operator in the household has less than three Minor convictions whose conviction date is within the last two years of the transaction effective date
  iii) Each Active operator in the household has one or less Major Convictions whose conviction date is within the last seven years of the transaction effective date.
  iv) The household has less than four At-Fault Accidents whose accident date is within the last five years of the transaction effective date.
  v) The household has less than six Minor Convictions whose conviction date is within the last five years of the transaction effective date.

Significantly, the decision software may determine whether the automobile policy can be issued or updated according to a series of predefined underwriting standards that are applied generally sequentially, such as for example if the decision software applies both the relatively simple standard and the relatively complex standard set forth above. More generally, the decision software may determine whether the automobile policy can be issued or updated according to a process during which a number of predefined decision points are sequentially encountered. Notably, if at any decision point the decision software determines that the request is to be denied based on a corresponding standard or the like, the processing performed by the decision software may be halted and the requestor may be informed that the request is in fact denied, either directly or by way of the aforementioned representative.

Of course, the requestor may take issue with the denial of the request in which case the requestor may argue against the denial to the representative if already in contact therewith, or the requestor may be directed to contact such a representative to argue against the denial. As a result, the representative may be able to placate the denied requestor, perhaps by suggesting an alternate course of action. Alternately, the representative may determine that the denied requestor might have a legitimate argument worthy of further consideration, or the denied requestor may regardless demand such further consideration. As may be appreciated, such further consideration is likely performed by a human underwriter or the like, and may result in an over-ride of the denial at the decision point or a confirmation of the denial at the decision point.

In the prior art, no particular process was in place in order to submit the denial to a human underwriter for a possible over-ride. Thus, the representative had to contact the underwriter, perhaps by phone or mail or in person, and had to explain the circumstances of the denial at the decision point to the underwriter, after which the underwriter perhaps had to obtain additional information regarding the circumstances of the denial, and perhaps had to consult with written underwriting policies before arriving at a decision on whether to over-ride the denial.

Significantly, the determination on whether to over-ride the denial was not subject to any time constraints and accordingly hours or even days could elapse before the decision was arrived at and communicated to the requestor. Likewise, no mechanism was in place to effectuate the determination on whether to over-ride the denial, nor was any mechanism in place to memorialize the determination.

Accordingly, a need exists for systems and methods that allow an organization to provide real-time over-ride capabilities. In particular, a need exists for systems and methods that present a denial of a request at a decision point to a human underwriter such that the underwriter can issue a decision on whether to over-ride the denial in real-time.

SUMMARY

The aforementioned needs are satisfied at least in part by a system and method utilized in connection with a requestor requesting a particular action from an organization. Decision software is provided to implement a decision process that handles and decides the request in a generally automated manner. The decision software determines whether to approve or deny the request according to predefined standards provided to the decision software. At a decision point corresponding to a particular standard, the decision software decides to deny the request based on the particular standard.

Information relating to the request and the denial decision is stored as a quote, and it is determined that further consideration of the denial decision by a human reviewer of the organization is desired. The human reviewer is contacted and retrieves the stored quote by way of an actuated interface that presents the quote as a focused screen including information from the quote and a determination entry device. The human interviewer determines based at least in part on the focused screen of the interface whether to over-ride the denial decision and enters such determination into the determination entry device of the interface. The entered determination is stored with the stored quote and the request proceeds in accordance with the stored determination.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
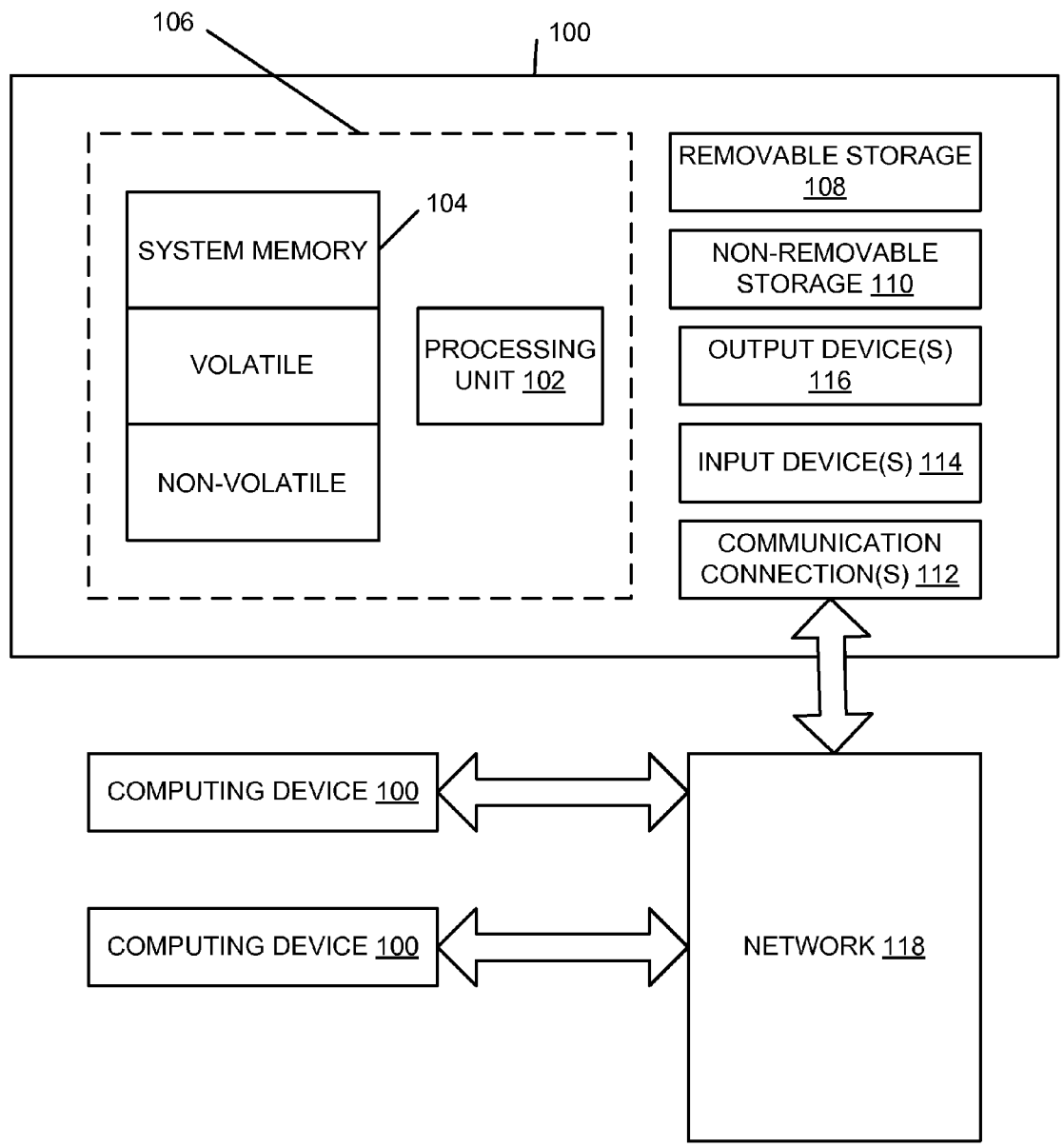
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Providing Real-Time Over-Ride Capability

Figure 2:
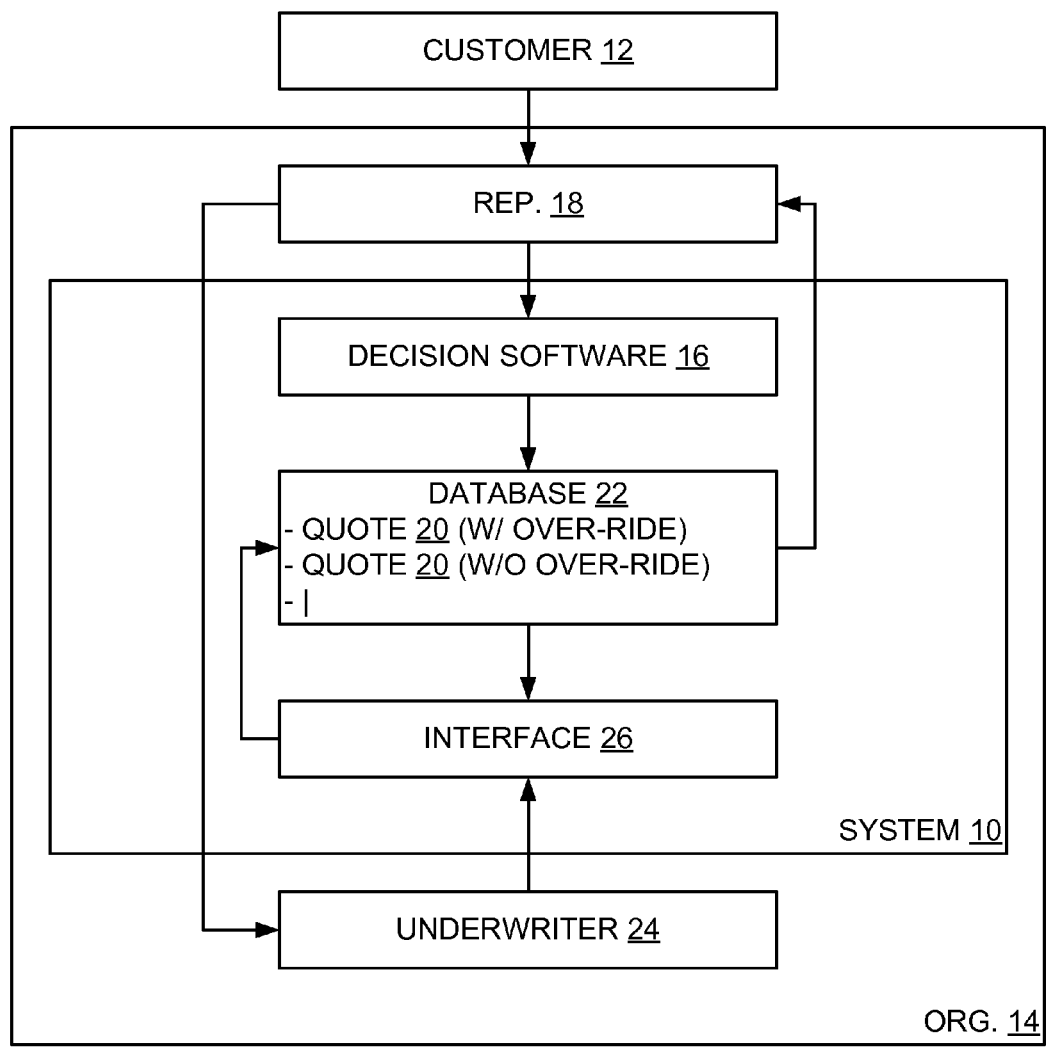
FIG. 2 is a block diagram of a system for providing a real-time over-ride capability in response to a denial decision in accordance with the various embodiments of the present innovation.

Turning now to FIG. 2, it is seen that a system 10 is provided to allow a requestor 12 to request a particular action from an organization 14 and to provide the requestor 12 with a decision on whether the organization 10 approves the request. Note here that the request, the requestor 12, and the organization 14 may be most any appropriate request, requestor, and organization without departing from the spirit and scope of the present innovation.

For example, the organization 14 may be a retailer and the request from the requestor 12 may be to return a product purchased from the organization 14. Likewise, the organization 14 may be a banking organization and the request from the requestor 12 may be for a line or credit, a loan, a credit account, a mortgage, or the like. Perhaps most relevantly, however, the organization 14 may be an insurance company or the like and the request from the requestor 12 may be for an insurance product offered by the insurance company, either as an originally issued product or an updated product.

Note that the decision is not necessarily with respect to the entirety of the requested action, but could be a part thereof. In the case of a retailer, it could be that the requestor 12 is requesting the return of an entire order, but the decision is based on an evaluation of a return policy as applied to each item in the order. Thus, in effect a separate decision is made regarding each item in the order. In the case of insurance, the decision may for example be with regard to each of several particular coverage features. Accordingly, even if the requestor 12 in effect submits a single request, such request may nevertheless be considered to be several requests and acted on accordingly without departing from the spirit and scope of the present innovation.'

Particularly if the insurance organization 14 experiences a high volume of such requests, such organization 14 may employ decision software 16 or the like to implement a decision process that handles and decides such requests in a generally automated manner. As should be understood, such a decision process varies based on the type of decision required, the type of insurance product, and the like.

As seen in FIG. 2, it may be that the decision software 16 is directly employed by the requestor 12 at an appropriate computing device, perhaps by way of a network connection between the requestor 12 and the system 10, or that the requestor 12 contacts an agent or representative 18 (hereinafter, 'representative 18'), perhaps by telephone or by ay of a direct chat connection, and the representative 18 directly employs the decision software 16 while in contact with the requestor 12. In any case, and as was set forth above, the decision software 16 is provided with information as supplied by the requestor 12, and also with information obtained from other sources. For example, if the request is for an insurance policy on a house, the requestor 12 may supply the address of the house and the decision software 16 may in turn employ such information to obtain information on whether the house is in a flood danger zone from a database as maintained for the benefit of the insurance organization 14.

As was set forth above, the decision software 16 based on all of the provided information the decision software determines whether the house policy can be issued or updated according to predefined underwriting standards provided to the decision software in a form recognizable by the decision software 16. Such predefined underwriting standards are known or should be apparent to the relevant public, and therefore need not be set forth herein in any detail. Likewise, providing such standards in a form recognizable by the decision software 16 is also known or should be apparent to the relevant public, and therefore need not be set forth herein in any detail.

As should be appreciated many such predefined underwriting standards may be considered by the decision software 16 in the course of deciding whether to approve the request from the requestor 12. For example, such standards may include whether the house is older than a predetermined age, whether the amount of insurance requested is too high or too low, whether a fire hydrant is within a set distance from the house, whether the house has previously suffered a major loss, whether the requestor has a good credit history, whether the requestor has been convicted of a property loss crime, and many more such standards.

Figure 3:
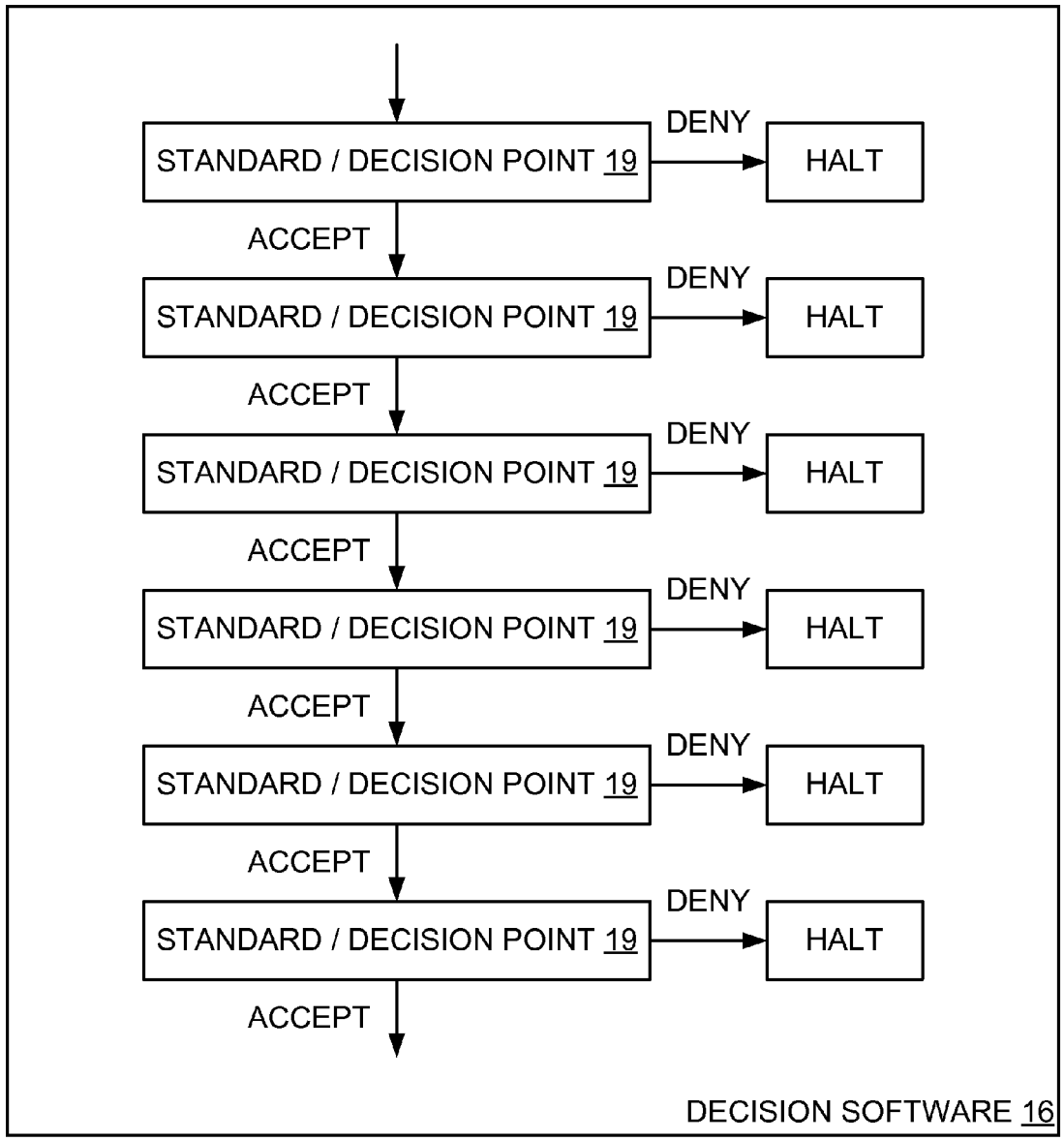
FIG. 3 is a block diagram of a logical process employed by decision software of the system of FIG. 2, including a series of decision points each of which has accept or deny as an outcome.

Accordingly, the decision software 16 will typically determine whether the request can be approved by sequentially applying all relevant underwriting standards in some determined order. Significantly, and in various embodiments of the present innovation, and as seen in FIG. 3, each standard has a corresponding decision point 19 at which the decision software 16 arrives at an accept or deny decision. As may be understood, if the decision software 16 arrives at an accept decision for a particular decision point 19, such decision software 16 continues to a subsequent standard, while if the decision software 16 arrives at a denial accept decision for the particular decision point 19, such decision software 16 halts. Upon so halting, the requestor 12 is informed that the request is in fact denied, either directly or by way of the aforementioned representative 18.

Figure 4:
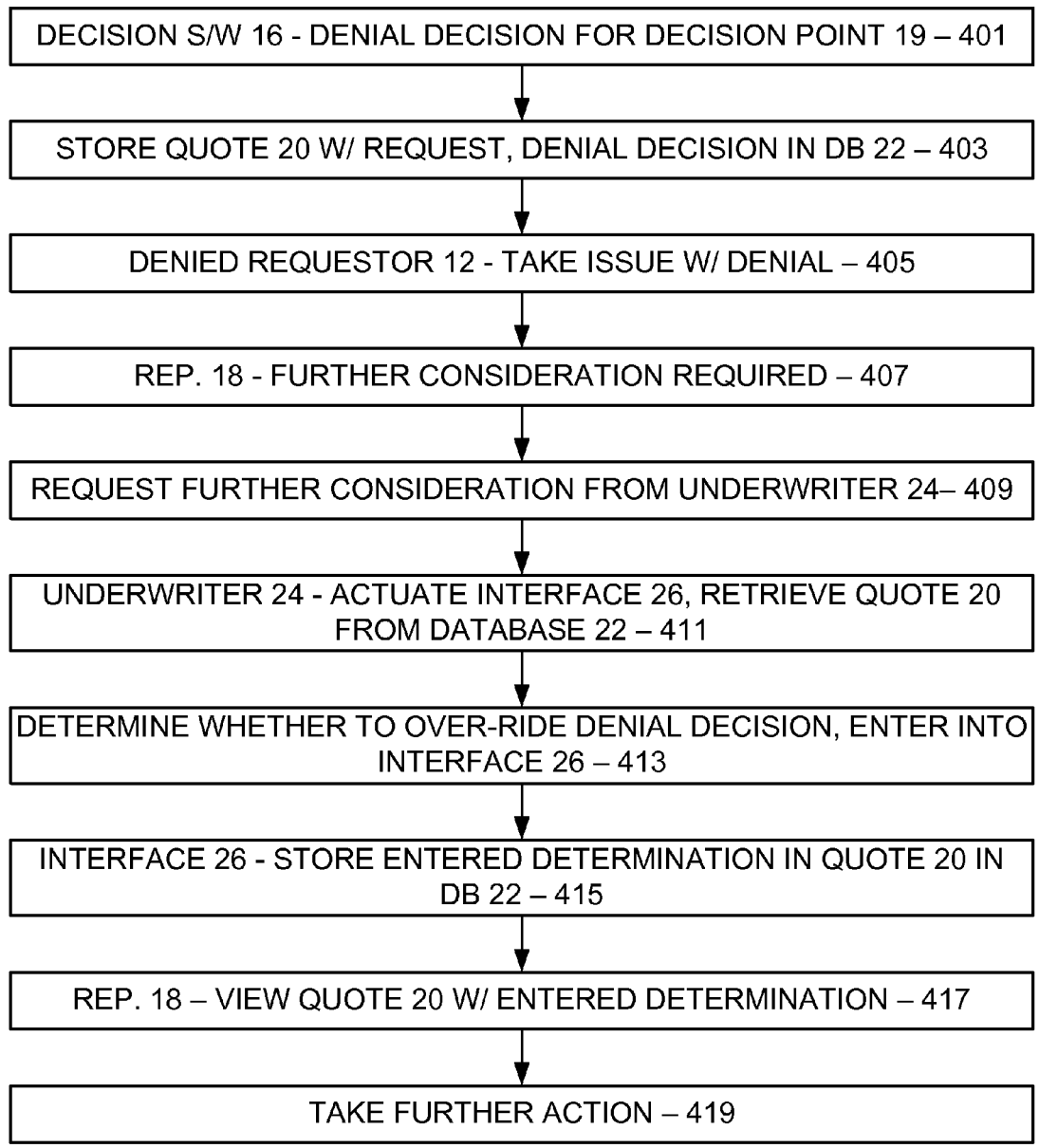
FIG. 4 is a flow diagram showing key actions performed in connection with the system of FIG. 2 in accordance with various embodiments of the present innovation.

Turning now to FIG. 4, if the decision software 16 arrives at a denial decision for a particular decision point 19 (401), and in various embodiments of the present innovation, the decision software 16 stores information relating to the request and the denial decision as a 'quote' 20 in a database 22 of the system 10 (403). As may be appreciated, such database 22 and such information in the quote 20 may be any appropriate database and information without departing from the spirit and scope of the present innovation.

For example, the information in the quote 20 may be substantially all of the information provided to the decision software 16 in the course of the request from the requestor 12, including an identification of the requestor 12 and the request. Notably, and in various embodiments of the present innovation, such information in such quote 20 also includes an identification of the decision point 19 that resulted in the denial decision and perhaps the corresponding underwriting standard and a statement on the reason for the denial decision.

As was noted above, the denied requestor 12 may among other things accept the denial, or else may take issue with the denial (405). In the latter case, the requestor 12 may argue against the denial to the representative 18 if already in contact therewith, or the requestor 12 may be directed to contact such a representative 18 to argue against the denial. As may be appreciated, with the quote 20 having the information relating to the request and the denial decision stored in the database 22, such quote 20 may be retrieved by a representative 18 in the latter case so that the representative 18 can examine the circumstances of the denial.

In due course, the representative 18 may be able to placate the denied and arguing requestor 12, perhaps by suggesting an alternate course of action. For example, if a requested coverage limit is denied, the alternate course of action may be to lower such coverage limit to an acceptable value. More relevant to the present disclosure, however, the representative 18 may determine that the denied and arguing requestor 12 may have a legitimate argument worthy of further consideration, or the denied and arguing requestor 12 may demand such further consideration regardless of anything the representative 18 may do or say (407). As was set forth above, such further consideration is typically performed by a human underwriter 24 or the like, and may result in a reversal or 'over-ride' of the denial at the decision point 19 or a confirmation of the denial at the decision point 19.

Reasons employed by an underwriter 24 to over-ride a denial are varied and can be most any reason without departing from the spirit and scope of the present innovation. For example, if the denial is based on a time standard that is almost but not quite met, the underwriter 24 may decide to over-ride the denial, perhaps if the requestor 12 is a good customer of the organization 14. Likewise, if the requestor 12 has a documented history showing that he or she represents a much lower risk than an automated rule contemplates, the underwriter 24 may likewise decide to over-ride the denial.

In various embodiments of the present innovation, the process of involving the underwriter 24 to possibly obtain an over-ride of the denial at the decision point 19 is automated such that the process can be performed in real-time or near-real-time (hereinafter, 'real-time'), which is at least within a reasonable period of time so that the requestor 12 in contact with the representative 18 need only wait a few moments. In particular, in such various embodiments, the representative 18 seeking further consideration for a possible over-ride would contact an underwriter 24 to request such further consideration (409). Note here that such contacting may be performed in most any appropriate manner without departing from the spirit and scope of the present innovation. For example, the representative 18 may contact the underwriter 24 by telephone, electronic mail, an instant message, a personalized electronic chat session, or the like. Note that the contact may include an identification of the quote 20, or at least an identification of the requester 12.

Upon being contacted, the underwriter 24 may then retrieve the quote 20 from the database 22 based on whatever information was provided thereto during the contact. In various embodiments of the present innovation, the underwriter 24 in retrieving the quote 20 from the database 22 actuates an interface 26 that presents the quote 20 to such underwriter 24 as a focused screen of information from the quote (411). Such interface 26 and such focused screen may be any appropriate interface and focused screen without departing from the spirit and scope of the present innovation. That said, it is presently envisioned that the focused screen of the interface 26 identifies the requestor 12, objective facts relating to the nature and circumstances of the quote 20 (an increased policy limit for an umbrella insurance policy from 1,000,000 USD to 2,000,000 USD, e.g.), the decision point 19 at which the denial decision arose, and perhaps other information, such as the corresponding standard, a rating of the requester 12 (a good customer, e.g.).

Significantly, the focused screen of the interface 26 also includes a determination entry device, such as for example a button or a check box, in various embodiments of the present innovation. Alternately, the interface 26 presents the determination entry device apart from the focused screen. Accordingly, the underwriter 24 can determine whether to over-ride the denial decision and enter such determination at the determination entry device of the interface 26 or at another appropriate entry point (413). Typically, although by no means exclusively, such determination may be arrived at and entered in a matter of minutes if not seconds, especially if the determination is a simple one.

As should be understood, the underwriter 24 is capable of providing the over-ride determination in the aforementioned real-time time frame by way of the interface 26 for the reason that the interface 26 typically presents all the information needed by the underwriter 24 to provide such determination. Accordingly, the underwriter 24 need not spend time searching for such information. Moreover, the interface 26 tends to act as a reminder that the over-ride determination is awaited, at least in a psychological manner, and thus the underwriter 24 is dissuaded from avoiding the determination or performing other chores while the determination awaits.

Once the underwriter 24 enters the determination at the determination entry device of the interface 26, and in various embodiments of the present innovation, the entered determination is stored in the quote 20 in the database 22 (415). Thereafter, the system 10 based on such stored quote 20 sends a message to the representative 18 that the determination has been made. The representative 18 may then retrieve the quote 20 with the entered determination or the quote 20 with the entered determination may be displayed automatically to the representative 18 (417). In either case, the representative 18 may then proceed to inform the requestor 12 of the determination, which as should be understood is either an over-ride or a confirmation of the denial of the request, and then to take further actions as may be appropriate based on the determination (419).

Such further action may be any appropriate action without departing from the spirit and scope of the present innovation. For example, if the determination confirms the denial of the request, the action may be to do nothing, or else to make an alternate or conforming request that likely should not be denied. Likewise, if the determination over-rides the denial of the request, the action may be to continue with the original request, in which case the decision software 16 would encounter any further decision point 19s relating to the request.

In various embodiments of the present innovation, an entered determination that over-rides a denial of a request is stored as at 415 as an over-ride in the database 22 or elsewhere as appropriate for a predetermined period of time, such as for example 30 days, and is accordingly valid for the period of time for the requestor 12 and with regard to the decision point 19 that is the basis of the denial. Accordingly, if the requester 12 decides to withdraw the original request and within the period of time re-instates the request or initiates a similar request, the decision software 16 based on the stored over-ride does not deny the request at the corresponding decision point 19. Instead, such a decline is preemptively avoided by the stored over-ride. Such stored over-ride may also be employed to continue with the original request.

Thus far, the various embodiments of the present innovation have been set forth primarily in terms of a requester 12 making a request from an insurance organization 14, where the request is denied at a decision point 19 and an underwriter 24 upon further consideration determines whether to over-ride the denial decision. However, and again, the requestor 12 may be making a request from most any organization 14, where the request is denied at a decision point 19 and an individual upon further consideration determines whether to over-ride the denial decision, all without departing from the spirit and scope of the present innovation.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided that allow an organization 14 to provide real-time over-ride capabilities. A denial of a request at a decision point 19 is presented to a human such as an underwriter 24 such that the underwriter 24 can issue a decision on whether to over-ride the denial in real-time.

It should be appreciated that changes could be made to the embodiments described above without departing from the innovative concepts thereof. For example, although the various embodiments of the present innovation are primarily set forth above in terms of an intermediary service 26, such intermediary service 26 may be omitted if the system 24 or a related system of the organization 10 is capable of performing the functionality of the intermediary service 26. Similarly, although the various embodiments of the present innovation are primarily set forth above in terms of a requestor 12 working with a representative 18 to seek an over-ride, such requestor 12 may alternately seek an over-ride in a computerized manner without directly contacting such a representative 18. It should be understood, therefore, that this innovation is not limited to the particular embodiments disclosed, but it is intended to cover modifications within the spirit and scope of the present innovation as defined by the appended claims.

The invention claimed is:

1. A method utilized in connection with a requestor requesting a particular action from an organization, the method comprising:
    providing decision software to implement a decision process that handles and decides the request in a generally automated manner, the decision software determining whether to approve or deny the request according to predefined standards provided to the decision software, the decision software deciding at a decision point corresponding to a particular standard to deny the request based on the particular standard;
    storing information relating to the request and the denial decision as a quote;
    determining whether or not further consideration of the denial decision by a human reviewer of the organization is demanded by the requestor;
    contacting the human reviewer to seek such further consideration when further consideration of the denial decision is demanded, the contacted human reviewer:
    retrieving the stored quote by way of an actuated interface that presents the quote as a focused screen including information from the quote and a determination entry device;
    determining based at least in part on the focused screen of the interface whether to over-ride the denial decision; and
    entering such determination into the determination entry device of the interface;
    storing the entered determination with the stored quote; and
    proceeding with the request in accordance with the stored determination.

2. The method of claim 1 wherein the organization is an insurance company, the request from the requestor is for an insurance product offered by the insurance company, the requested product is one of originally issued according to the request and updated according to the request, and the human reviewer is an insurance underwriter.

3. The method of claim 1 wherein the quote includes information provided to the decision software for the requestor, an identification of the decision point that resulted in the denial decision, and the particular standard corresponding thereto.

4. The method of claim 1 wherein contacting the human reviewer and receiving the determination therefrom occurs while the requestor is in contact with a representative of the organization.

5. The method of claim 1 wherein the presented quote as retrieved by the interface includes facts relating to the nature and circumstances of the quote and the decision point that resulted in the denial decision.

6. The method of claim 1 wherein the entered determination over-rides the denial decision, and wherein the decision software continues with the request.

7. The method of claim 1 wherein the entered determination overrides the denial decision and wherein the entered determination is valid for a predetermined period of time for the requestor and with regard to the decision point that resulted in the denial decision.

8. A computer-readable storage medium having stored thereon computer-executable instructions implementing a method utilized in connection with a requestor requesting a particular action from an organization, the method comprising:
   providing decision software to implement a decision process that handles and decides the request in a generally automated manner, the decision software determining whether to approve or deny the request according to predefined standards provided to the decision software, the decision software deciding at a decision point corresponding to a particular standard to deny the request based on the particular standard;
   storing information relating to the request and the denial decision as a quote;
   determining whether or not further consideration of the denial decision by a human reviewer of the organization is demanded by the requestor;
   contacting the human reviewer to seek such further consideration when further consideration of the denial decision is demanded, the contacted human reviewer:
   retrieving the stored quote by way of an actuated interface that presents the quote as a focused screen including information from the quote and a determination entry device;
   determining based at least in part on the focused screen of the interface whether to over-ride the denial decision; and
   entering such determination into the determination entry device of the interface;
   storing the entered determination with the stored quote; and
   proceeding with the request in accordance with the stored determination.

9. The medium of claim 8 wherein the organization is an insurance company, the request from the requestor is for an insurance product offered by the insurance company, the requested product is one of originally issued according to the request and updated according to the request, and the human reviewer is an insurance underwriter.

10. The medium of claim 8 wherein the quote includes information provided to the decision software for the requestor, an identification of the decision point that resulted in the denial decision, and the particular standard corresponding thereto.

11. The medium of claim 8 wherein contacting the human reviewer and receiving the determination therefrom occurs while the requestor is in contact with a representative of the organization.

12. The medium of claim 8 wherein the presented quote as retrieved by the interface includes facts relating to the nature and circumstances of the quote and the decision point that resulted in the denial decision.

13. The medium of claim 8 wherein the entered determination over-rides the denial decision, and wherein the decision software continues with the request.

14. The medium of claim 8 wherein the entered determination overrides the denial decision and wherein the entered determination is valid for a predetermined period of time for the requestor and with regard to the decision point that resulted in the denial decision.

15. A system utilized in connection with a requestor requesting a particular action from an organization, the system comprising:
   decision software operating to implement a decision process that handles and decides the request in a generally automated manner, the decision software determining whether to approve or deny the request according to predefined standards provided to the decision software, the decision software deciding at a decision point corresponding to a particular standard to deny the request based on the particular standard;
   a sub-system that stores information relating to the request and the denial decision as a quote, wherein it is determined whether or not further consideration of the denial decision by a human reviewer of the organization is demanded by the requestor, and wherein the human reviewer is contacted to seek such further consideration when further consideration of the denial decision is demanded;
   a sub-system that retrieves the stored quote for the human reviewer by way of an actuated interface that presents the quote as a focused screen including information from the quote and a determination entry device, wherein the human reviewer determines based at least in part on the focused screen of the interface whether to over-ride the denial decision;
   a sub-system that receives such determination into the determination entry device of the interface;
   a sub-system that stores the entered determination with the stored quote; and
   a sub-system that proceeds with the request in accordance with the stored determination.

16. The system of claim 15 wherein the organization is an insurance company, the request from the requestor is for an insurance product offered by the insurance company, the requested product is one of originally issued according to the request and updated according to the request, and the human reviewer is an insurance underwriter.

17. The system of claim 15 wherein the quote includes information provided to the decision software for the requestor, an identification of the decision point that resulted in the denial decision, and the particular standard corresponding thereto.

18. The system of claim 15 wherein contacting the human reviewer and receiving the determination therefrom occurs while the requestor is in contact with a representative of the organization.

19. The system of claim 15 wherein the presented quote as retrieved by the interface includes facts relating to the nature and circumstances of the quote and the decision point that resulted in the denial decision.

20. The system of claim 15 wherein the entered determination over-rides the denial decision, and wherein the decision software continues with the request.

21. The system of claim 15 wherein the entered determination overrides the denial decision and wherein the entered determination is valid for a predetermined period of time for the requestor and with regard to the decision point that resulted in the denial decision.

* * * * *